May 28, 1929.  R. H. HOYT  1,715,035
APPARATUS FOR MANUFACTURING ELECTRICAL CONDENSERS
Filed Dec. 21, 1927   2 Sheets-Sheet 1
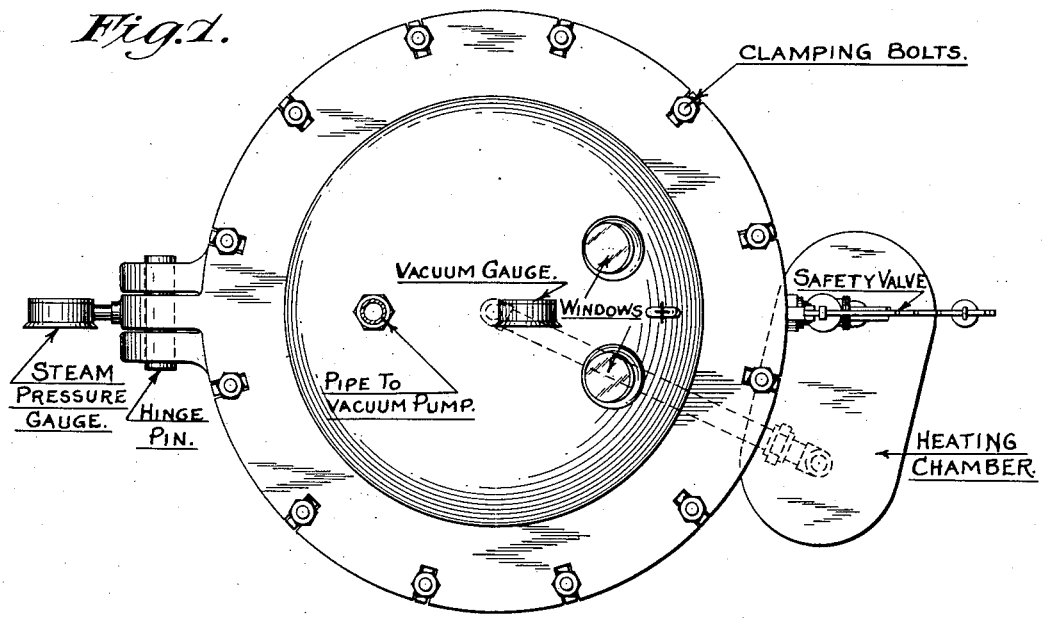
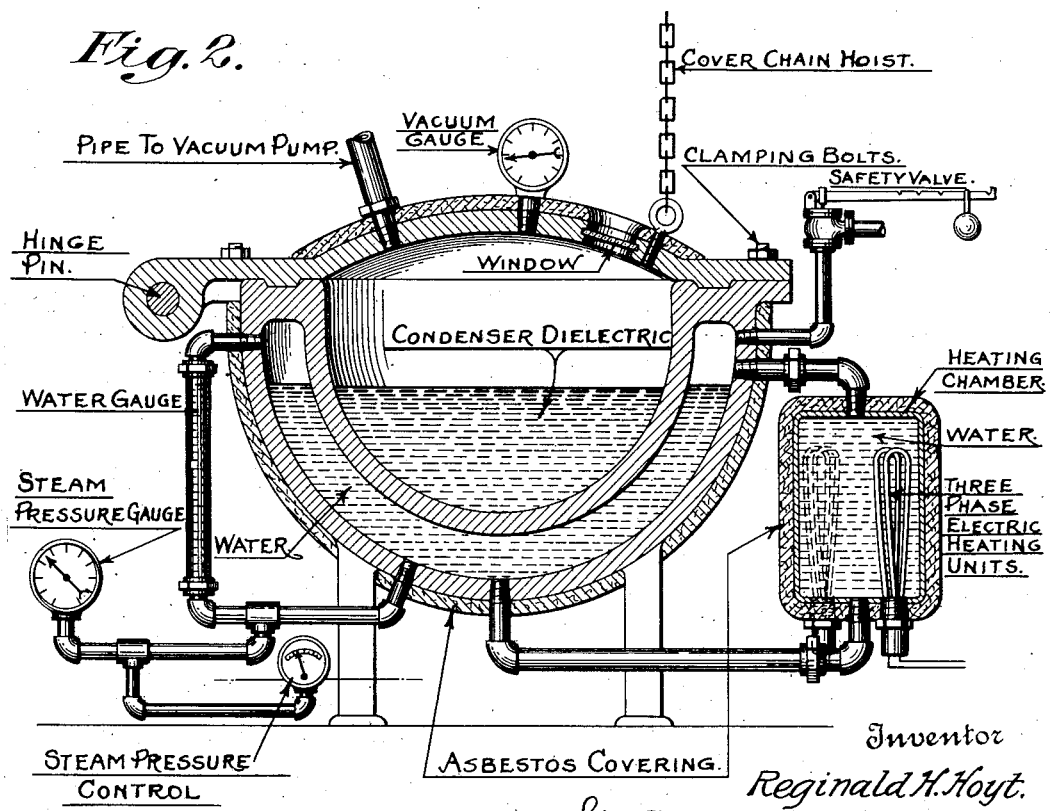

Inventor:
Reginald H. Hoyt.

Patented May 28, 1929.

1,715,035

UNITED STATES PATENT OFFICE.

REGINALD H. HOYT, OF ROSLINDALE, MASSACHUSETTS, ASSIGNOR TO WIRELESS SPECIALTY APPARATUS COMPANY, OF BOSTON, MASSACHUSETTS, A CORPORATION OF NEW YORK.

APPARATUS FOR MANUFACTURING ELECTRICAL CONDENSERS.

Application filed December 21, 1927. Serial No. 241,496.

This invention relates to electrical condensers and apparatus for manufacturing the same, and more particularly to a new and improved vacuum waxing or oiling tank for impregnating the condensers with insulating material.

The tank comprises a chamber adapted to contain wax, oil or other material with which the condenser is to be impregnated, and includes means for reducing the pressure within said chamber while at the same time applying heat thereto. The heat is applied externally by means of a steam jacket which surrounds a portion of the chamber. Electrical heating coils are utilized for producing the steam and are controlled by an automatically operated switch actuated by the steam pressure.

Since the temperature of steam is determined by its pressure, the apparatus is capable of maintaining the chamber at any desired temperature. The heating coils are insulated and placed directly in the water to be heated, in order to insure a rapid and efficient transfer of heat.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a top plan view of the apparatus constructed in accordance with the present invention;

Fig. 2 is a central vertical section thereof;

Figure 3:
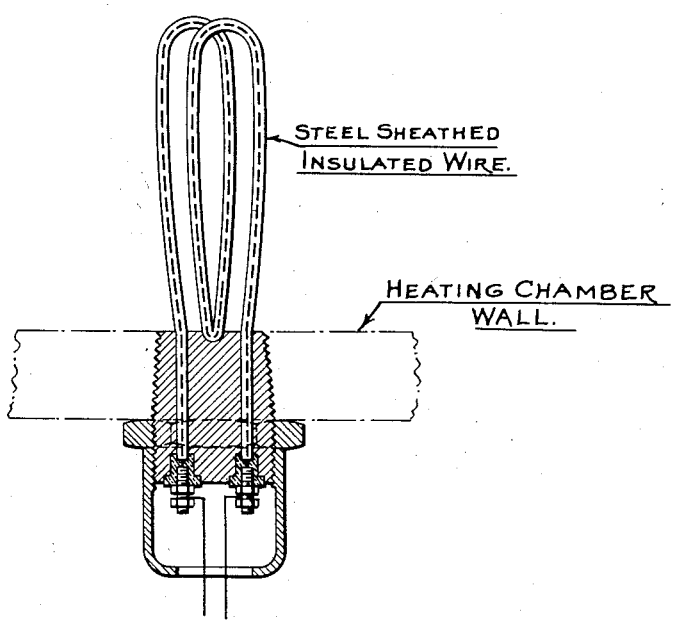
Fig. 3 is an enlarged detail view of a heating element.

In the following description and in the claims parts will be identified by specific names for convenience, but they are intended to be as generic in their application to similar parts as the art will permit.

The particular embodiment of the invention disclosed in the drawings, comprises (Figs. 1 and 2) a container or tank, the walls of which are provided with an annular recess forming a jacket to receive water and steam or other heating medium. The annular jacket is provided with a safety valve and water gauge to indicate the level of water therein, as well as a steam pressure gauge and a steam pressure control to be described hereinafter.

The water may be heated in a separate heating chamber connected at the bottom and top with the jacket whereby continuous circulation is obtained. Heat may be applied to the water in the heating chamber by any suitable means as heating coils shown in Figs. 2 and 3, supplied from a three-phase alternating current main as shown in Fig. 4.

The heating coils may be of any preferred construction, as for example, a steel sheathed insulated wire secured to a threaded plug, which may be readily inserted in the walls of the heating chamber. The heating element itself is insulated from the steel sheath and from the plug, and is protected thereby from the water in the chamber.

An asbestos covering may be applied to both the heating chamber and the hemispherical container in order to prevent heat radiation. Said container may be closed by a suitable cover member hinged thereto as by a hinge pin and secured in place by clamping bolts. A cover chain hoist may be utilized for removing said cover for filling the container with dielectric material and for inserting the condenser to be treated therein. A pipe connection to a vacuum pump and a vacuum gauge are carried by said cover and windows are provided therein through which the condition of the material under treatment may be observed.

Figure 4:
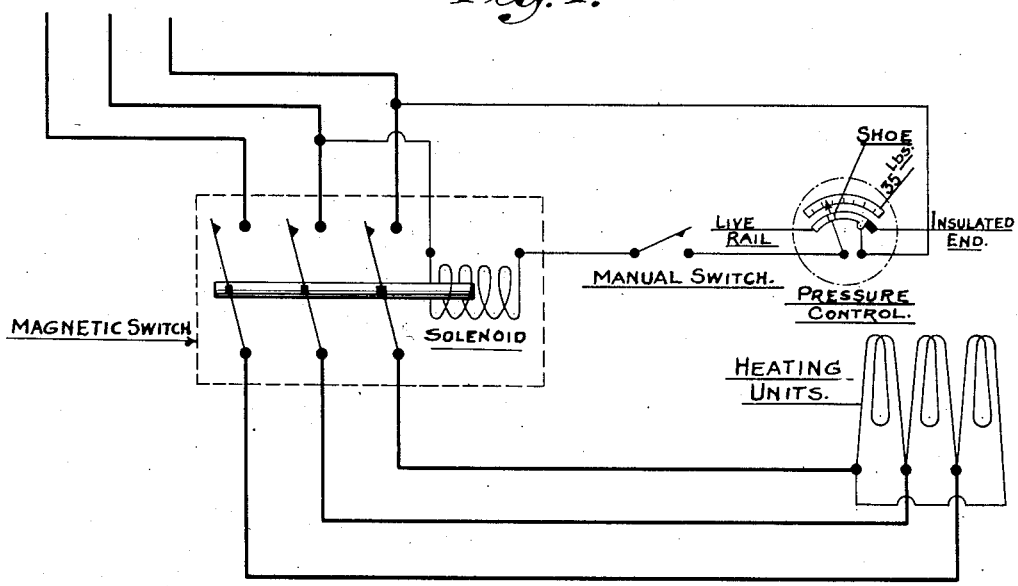
Fig. 4 shows diagrammatically the electrical control circuit.

A plurality of heating units, preferably three, may be connected in the usual manner to a three-phase supply line as shown in Fig. 4, and the current therein controlled by a solenoid operated magnetic switch. The solenoid may be connected to one phase of the system and may be controlled by a manual switch and an automatic steam pressure control switch connected in series. The latter switch comprises a steam pressure gauge provided with a commutator or live rail. A shoe is attached to the pointer of the gauge in suitable position to cooperate with the live rail. An insulated end is located adjacent said live rail in a position which the shoe will assume when a definite pressure, as for example 35 pounds, obtains within the steam jacket.

The solenoid may be operated for closing the magnetic switch by merely closing the manual switch and current applied thereby to the electric heating units. When the steam pressure reaches 35 pounds, current through the solenoid will be broken by the steam pressure control switch and the magnetic switch opened. The switch will then remain open until the steam pressure has again been reduced to the desired value when the control switch will again close.

A condenser (not shown) may be immersed in a bath of wax, oil or other suitable material contained in the treating chamber. Heat may then be applied as aforementioned and regulated by controlling the steam pressure while the pressure within the chamber itself is reduced by means of a vacuum pump. The operation may then be continued and observed through windows in the cover until the proper conditions are obtained.

The invention provides a cheap, simple and compact apparatus for heating dielectric material under reduced pressure and applying the same to a condenser. By automatically controlling the steam pressure, heat may be maintained at any desired degree, and the conditions to which the condenser is subjected may be accurately regulated. Furthermore, danger of injury to the apparatus due to excessive heat is eliminated since the heating current is disconnected whenever the steam pressure rises above a predetermined given maximum.

The apparatus described provides independent means for maintaining a reduced pressure within the container and for regulating the heat of the contents thereof. By employing a steam jacket around the tank for transferring heat through the walls thereof to the material under treatment, the heating means is entirely removed from contact with the contents of the tank and is independent of the pressure within the tank. Furthermore, the cover is of simple construction since it is independent of the heating means and is only required to withstand the reduced pressure within the tank.

The invention is described as applied to an oiling or waxing tank for use in condenser manufacture. It is, however, not limited thereto but may obviously be employed generally where articles are to be treated at a high temperature under reduced pressure.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with a treating chamber for subjecting articles to heat at reduced pressure, a water jacket therefor, a heating chamber, means for providing a continuous circulation from said water jacket to said heating chamber, means for heating the water in said heating chamber, comprising an electrical heating unit and means operable in accordance with the pressure in said water jacket for controlling the current applied to said unit.

2. An apparatus for use in manufacturing condensers comprising a chamber adapted to contain a dielectric material, a steam jacket associated with said chamber for applying heat thereto, a heating chamber associated with said steam jacket, electrical means for heating water therein, said means being controlled by the steam pressure in said steam jacket, and means for reducing the pressure within said treating chamber.

3. A treating chamber adapted to receive dielectric material, an annular steam chamber concentric therewith, a heating chamber, means for heating the material within said heating chamber and transferring said heated material to said steam chamber, a steam pressure gauge, means operated thereby for controling said heating means, means for reducing the pressure within said treating chamber, and means for observing the contents thereof.

In testimony whereof I hereunto affix my signature.

REGINALD H. HOYT.